Feb. 21, 1928.

E. O. MYRGREN

SAFETY PIN

Filed April 9, 1927

1,660,231

Inventor:
Erik Olov Myrgren.

Patented Feb. 21, 1928.

1,660,231

UNITED STATES PATENT OFFICE.

ERIK OLOV MYRGREN, OF BOLLSTABRUK, SWEDEN.

SAFETY PIN.

Application filed April 9, 1927. Serial No. 183,021.

Figure 1:
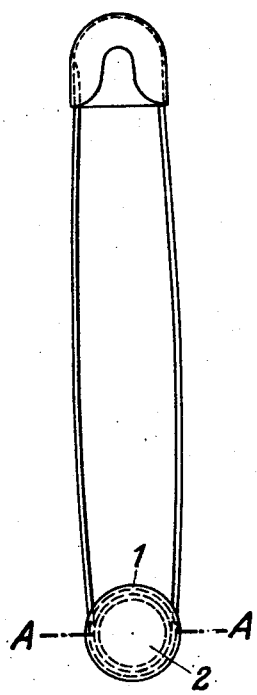
Figure 2:
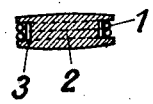

The usual safety pins suffer from the drawback that their spirally bent end often times get clamped fast in the fabric, which entails the danger that the fabric, especially if it is thin, might be torn when the pin is withdrawn from it somewhat suddenly or, if the clamping fast is perceived in time, more or less time gets lost by unclamping the pin and the fabric from one another. All that is obviated by my improved safety pin, as illustrated diagrammatically and by way of example on the accompanying drawing on which Figure 1 is a side-view of a safety pin designed according to this invention, the pin being drawn to an enlarged scale, and Figure 2 is a cross-section in the plane A—A of Fig. 1.

The spirally wound part 1 of the safety pin encompasses a grooved disk 2, in the groove of which the spiral 1 is located. The disk 2 has been, originally, a sort of a short and thick rivet. This rivet has been put through the spiral and its projecting end had then been jumped so as to be turned into a rivet head, whereby the rivet has been converted into a disk, viz, the disk 2. Preferably a rubber ring 3 is inserted between the bottom of the groove of the disk and the spiral. The rubber ring is shoved upon the shaft of the rivet prior to putting this latter through the spiral, and then the rivet head is jumped, as already described. The dimensions i. e. the diameters of the spiral, the rivet and the rubber ring relatively to each other, must be chosen with due consideration to the fact that the diameter of the spiral becomes a little smaller when the needle is closed. If, for instance, the diameter of the rivet would be even a little too large, the elasticity of the spiral would be diminished, perhaps entirely annihilated.

I wish it to be understood that I do not limit myself to the exact details of the constructional form of the safety-pin, as shown in the drawing by way of example. There may be departures in the details without constituting a departure from the invention.

I claim:

A safety-pin, comprising, in combination with the spirally bent part of the wire forming the body of the needle and the needle proper, a grooved disk receiving the spiral of the safety pin in its groove, and a rubber ring encompassing the bottom of said groove and being located, therefore, between the groove bottom and said spiral, substantially as set forth.

In testimony whereof I affix my signature.

ERIK OLOV MYRGREN.